(12) United States Patent
Lee et al.

(10) Patent No.: US 8,301,127 B2
(45) Date of Patent: Oct. 30, 2012

(54) METHOD, DEVICE AND SYSTEM FOR DISPLAYING CALLER IDENTIFICATION INFORMATION

(75) Inventors: Jong-Kyu Lee, Gwacheon-si (KR); Chul-Yong Jeon, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 987 days.

(21) Appl. No.: 11/969,473

(22) Filed: Jan. 4, 2008

(65) Prior Publication Data

US 2008/0167022 A1    Jul. 10, 2008

(30) Foreign Application Priority Data

Jan. 4, 2007    (KR) .................. 10-2007-0001066

(51) Int. Cl.
*H04M 3/42* (2006.01)
(52) U.S. Cl. ............. 455/415; 379/88.18; 379/88.21
(58) Field of Classification Search ............... 455/426.1, 455/415; 379/88.18, 88.21
See application file for complete search history.

(56) References Cited

U.S. PATENT DOCUMENTS

| 5,459,458 | A  | * | 10/1995 | Richardson et al. ......... 340/9.15 |
| 5,966,652 | A  | * | 10/1999 | Coad et al. .................. 455/412.1 |
| 5,974,130 | A  | * | 10/1999 | Sadri et al. ................. 379/211.01 |
| 6,128,487 | A  | * | 10/2000 | Wiedeman .................. 455/426.1 |
| 6,272,339 | B1 | * |  8/2001 | Wiedeman .................. 455/426.1 |
| 2004/0208301 | A1 | * | 10/2004 | Urban et al. ............. 379/142.17 |
| 2005/0097131 | A1 |   |  5/2005 | Benco et al. |
| 2005/0287997 | A1 | * | 12/2005 | Fournier .................... 455/415 |
| 2008/0026736 | A1 | * |  1/2008 | Funabashi et al. ........... 455/415 |

FOREIGN PATENT DOCUMENTS

| CN | 1829245 | * | 6/2006 |
| CN | 1829245 | * | 9/2006 |
| KR | 1020050052167 |  | 6/2005 |
| KR | 1020060097280 |  | 9/2006 |

* cited by examiner

*Primary Examiner* — Lester Kincaid
*Assistant Examiner* — Mehmood B Khan
(74) *Attorney, Agent, or Firm* — The Farrell Law Firm, P.C.

(57) ABSTRACT

Provided are a method, a device, and a system for displaying at least one character for identifying a caller, together with the caller's phone number, on a recipient's mobile phone when an incoming call is received. The system includes a caller's mobile phone for allowing the caller to input a recipient's phone number and at least one character desired to be added after the phone number, generating an outgoing call message including the caller's phone number, recipient's phone number and input word or phrase for an outgoing call, and sending the generated message; a base station for receiving the outgoing call message, and changing the outgoing call message to an incoming call message which will be sent to the recipient's mobile phone; and the recipient's mobile phone for receiving the incoming call message and outputting any word or phrase included in the incoming call message.

13 Claims, 5 Drawing Sheets

METHOD, DEVICE AND SYSTEM FOR DISPLAYING CALLER IDENTIFICATION INFORMATION

PRIORITY

This application claims priority to an application entitled "Method, Device and System for Displaying Caller Identification Information" filed with the Korean Intellectual Property Office on Jan. 4, 2007 and assigned Serial No. 2007-1066, the entire disclosure of which is hereby incorporated by reference.

BACKGROUND OF THE INVENTION

1. Field of the Invention

The present invention relates to a mobile phone, and more particularly to a method, a device and a system for displaying caller identification information on a mobile phone.

2. Description of the Related Art

Calling Number IDentification ("CNID") is a service that displays a caller's phone number on a called party's mobile phone simultaneously with the output of a ring tone when an incoming call from the caller is received through a base station.

However, conventional mobile phones offering the CNID service have the problem of displaying only the number of a calling phone to identify the source of an incoming call.

SUMMARY OF THE INVENTION

Accordingly, the present invention has been made to solve the above-mentioned problems occurring in the prior art, and the present invention provides a method, a device and a system for displaying at least one character for identifying a caller, together with the caller's phone number, on a recipient's mobile phone when an incoming call is received.

In accordance with a first aspect of the present invention, there is provided a system for providing caller identification information, which includes a caller's mobile phone for allowing the caller to input a recipient's phone number and at least one character desired to be added after the phone number, generating an outgoing call message including the caller's phone number, recipient's phone number and input word or phrase when the caller inputs a request for making an outgoing call, and sending the generated message; a base station for receiving the outgoing call message, searching for a recipient's mobile phone based on the recipient's phone number, changing the outgoing call message to an incoming call message which will be sent to the recipient's mobile phone; and the recipient's mobile phone for receiving the incoming call message, determining whether any word or phrase is included in the incoming call message, extracting the caller's phone number and the word or phrase from the incoming call message, and outputting the extracted phone number and word or phrase.

In accordance with a second aspect of the present invention, there is provided a method for displaying caller identification information on a call recipient's mobile phone, which includes allowing a caller to input a recipient's phone number and at least one character desired to be added after the phone number; generating an outgoing call message including the caller's phone number, recipient's phone number and input word or phrase when the caller inputs a request for making an outgoing call, and sending the generated message to the recipient's mobile phone; receiving an incoming call message at the recipient's mobile phone; determining whether any word or phrase is included in the incoming call message; extracting the caller's phone number and the word or phrase from the incoming call message; and outputting the extracted phone number and word or phrase on the recipient's mobile phone.

In accordance with a third aspect of the present invention, there is provided a method for providing caller identification information from a caller's mobile phone, which includes allowing a caller to input a recipient's phone number and at least one character desired to be added after the phone number; generating an outgoing call message including the caller's phone number, recipient's phone number and input word or phrase when the caller inputs a request for making an outgoing call, and sending the generated message.

In accordance with a fourth aspect of the present invention, there is provided a method for displaying caller identification information on a call recipient's mobile phone, which includes receiving an incoming call message; determining whether any word or phrase is included in the incoming call message; extracting the caller's phone number and the word or phrase from the incoming call message; and outputting the extracted phone number and word or phrase.

In accordance with a fifth aspect of the present invention, there is provided a device for providing caller identification information in a caller's mobile phone, which includes a display unit; a memory for storing at least one word or phrase; and a control unit for inputting a recipient's phone number and at least one character entered by a caller, generating an outgoing call message including the caller's phone number, recipient's phone number and input word or phrase when the caller inputs a request for making an outgoing call, and sending the generated message.

In accordance with a sixth aspect of the present invention, there is provided a device for displaying caller identification information on a call recipient's mobile phone, which includes a display unit; and a control unit for receiving an incoming call message, determining whether any word or phrase is included in the incoming call message, extracting the caller's phone number and the word or phrase from the incoming call message, and outputting the extracted phone number and word or phrase.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EXEMPLARY EMBODIMENTS

Hereinafter, exemplary embodiments of the present invention will be described with reference to the accompanying drawings. In the following description of the present invention, a detailed description of known functions and configurations incorporated herein will be omitted when it may make the subject matter of the present invention unclear.

Figure 1:
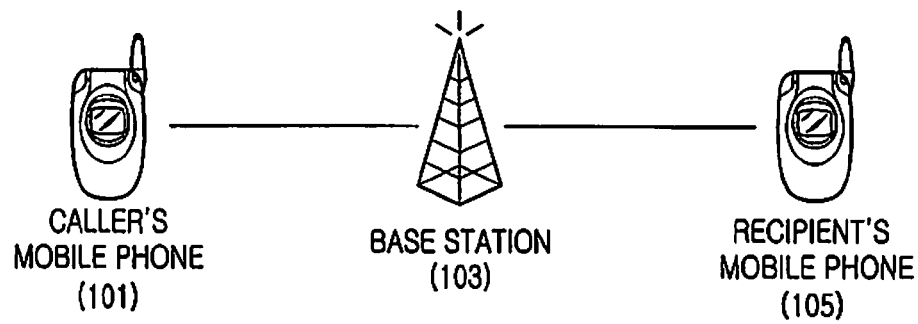
FIG. 1 illustrates a system for providing a caller identification service according to an exemplary embodiment of the present invention.

FIG. 1 illustrates a system for providing a caller identification service according to an exemplary embodiment of the present invention The system includes a caller's mobile phone 101, a base station 103 and a recipient's mobile phone 105.

The caller's mobile phone 101 checks whether the caller inputs a recipient's phone number. For example, the caller's mobile phone 101 may directly receive the recipient's phone number input by the user. In another example, the caller's mobile phone 101 may receive the phone number selected from those previously stored in a phone book as the recipient's phone number. After input of the recipient's phone number, the caller's mobile phone 101 determines whether the caller inputs a request for adding at least one character representing the caller. According to the request, the caller's mobile phone allows the caller to input a desired word or phrase.

When the caller inputs a request for making an outgoing call, the mobile phone 101 generates an outgoing call message including the caller's phone number, recipient's phone number and input word or phrase, and sends the generated outgoing call message to the base station 103 through a signaling channel.

Upon receiving the outgoing call message from the caller's mobile phone 101, the base station 103 searches for the recipient's mobile phone 105 corresponding to the recipient's phone number included in the outgoing call message. The base station 103 changes the outgoing call message to an incoming call message and sends the incoming call message to the recipient's mobile phone 105.

The recipient's mobile phone 105 analyzes the incoming call message received from the base station 103 in order to extract the caller's phone number and word or phrase input by the caller. The recipient's mobile phone 105 outputs the extracted phone number and word or phrase to identify the caller. Alternatively, the recipient's mobile phone 105 may output only the word or phrase identifying the caller.

The configuration of the caller identification system has been explained with reference to FIG. 1. Hereinafter, the configuration of a mobile phone, which can be used as a caller's mobile phone 101 or a recipient's mobile phone 105, will be explained in detail.

Figure 2:
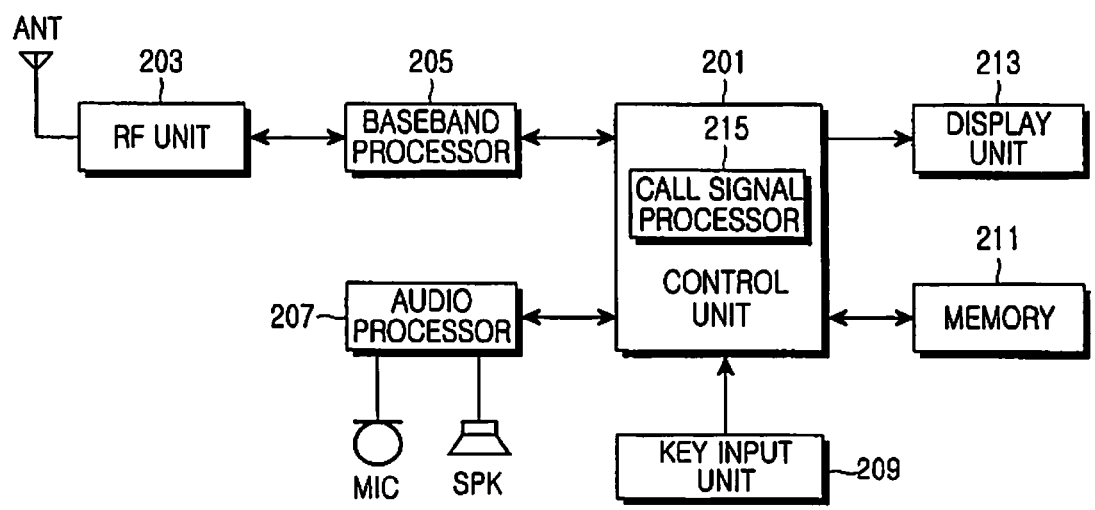
FIG. 2 is a block diagram of a caller's/recipient's mobile phone according to an exemplary embodiment of the present invention.

FIG. 2 is a block diagram of a mobile phone according to an exemplary embodiment of the present invention. The configuration of the mobile phone will be explained with reference to FIGS. 1 and 2.

The mobile phone includes a control unit 201, a baseband processor 205, an audio processor 207, a key input unit 209, a memory 211, and a display unit 213 which are all connected to the control unit 201, and an RF (Radio Frequency) unit 203 connected to the baseband processor 205.

The RF unit 203 includes an RF transmitter for performing upward conversion and amplification of a frequency of a transmitted signal and an RF receiver for amplifying a low-noise received signal and performing downward conversion of the signal frequency. When the mobile phone is the caller's terminal 101, the RF unit 203 sends an outgoing call message to the base station 103 through a signaling channel. When the mobile phone is the recipient's mobile phone 105, the RF unit 203 receives an incoming call message from the base station 103.

The baseband processor 205 includes a transmitter for encoding and modulating a transmitted signal and a receiver for demodulating and decoding a received signal.

The audio processor 207 converts an audio signal output from the control unit 201 into audible sound and outputs the sound to a speaker. The key input unit 209 provided with a plurality of alphanumeric keys, symbol keys such as '*' and '#' keys, and various function keys. The key input unit 209 generates a signal corresponding to a key pressed by a user and outputs the generated signal to the control unit 201.

The display unit 213 displays a current state and operational mode of the mobile phone under the control of the control unit 201. The display unit 213 may include an LCD (Liquid Crystal Display) or an OLED (Organic Light Emitting Diode) display.

The memory 209 stores data necessary to control operations of the mobile phone. Particularly, the memory 209 stores at least one word or phrase, which can be included in caller identification information.

The control unit 201 controls each functional part of the mobile phone. When the mobile phone is used as the caller's terminal 101, the control unit 201 checks whether the user requests for an insertion of at least one character after inputting a recipient's phone number.

Upon detecting the user's request for the insertion of at least one character, the control unit 201 generates an identifier for identifying at least one character added by the user and inserts the generated identifier after the recipient's phone number. The user can input a desired word or phrase after the identifier. The user can select at least one character from those previously stored in the memory 211 or directly input a desired word or phrase. The control unit 201 then displays the word or phrase selected or input by the user on the display unit 213.

When the user inputs a request for making an outgoing call, a call signal processor 215 of the control unit 201 generates an outgoing call message including the input word or phrase, a recipient's phone number, and a caller's phone number and identifier. If the user (i.e. caller) does not request for an insertion of at least one character, the call signal processor 215 of the control unit 201 will generate an outgoing call message including only the recipient's phone number and the caller's phone number.

When the mobile phone is used as the recipient's mobile phone 105, the control unit 201 checks whether an incoming call message is received from the base station 103 through a signaling channel. When an incoming call message is received, the call signal processor 215 of the control unit analyzes the incoming call message to extract the caller's phone number. The call signal processor 215 also checks whether any word or phrase is included in the incoming call message. To be specific, the call signal processor 215 of the control unit 201 checks whether any identifier is included in the incoming call message in order to detect at least one character included in the incoming call message.

In other words, the call signal processor 215 of the control unit 201 analyzes the incoming call message to extract the word or phrase included in the message. Then, the control unit 201 outputs the extracted word or phrase and caller's phone number altogether, or only the extracted word or phrase. If no word or phrase is included in the incoming call message, the control unit 201 will output only the caller's phone number.

Figure 3:
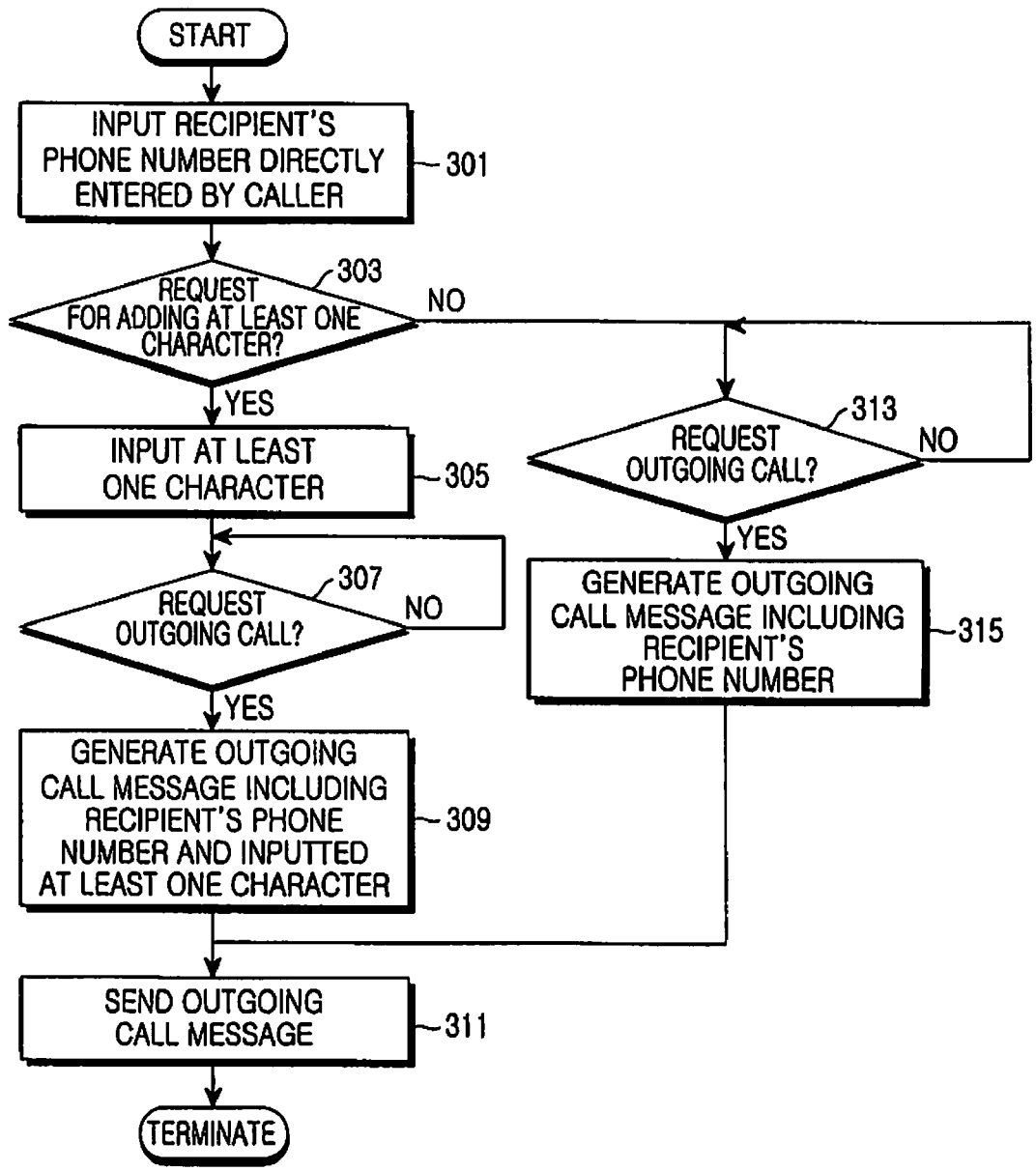
FIG. 3 is a flowchart showing a process of generating and sending an outgoing call message from a caller's mobile phone according to a first embodiment of the present invention.

FIG. 3 is a flowchart showing a process of generating and sending an outgoing call message from the caller's mobile phone 101 according to a first embodiment of the present invention. This process performed in the caller's mobile phone 101 will be explained in detail with reference to FIGS. 1 through 3.

In step 301, the control unit 201 inputs a recipient's phone number as directly entered by the caller. Specifically, the control unit 201 may receive a key signal corresponding to keys input by the caller and then display a phone number corresponding to the input key signal on the display unit 213. If the caller's mobile phone 101 is a device capable of speech recognition, the control unit 201 may input the recipient's phone number according to a caller's spoken input.

If the caller inputs a request to add at least one character in step 303, the control unit 201 will proceed to step 305. Otherwise, the control unit 201 will proceed to step 313.

In step 305, the control unit 201 generates an identifier after the previously input phone number in order to differentiate at least one character added by the caller from the recipient's phone number. When the caller inputs a desired word or phrase, the control unit 201 outputs the input word or phrase to the display unit 213 and then proceeds to step 307.

At this time, the caller may select a desired word or phase form those previously stored in the memory 211 or directly input the word or phrase. The control unit 201 displays the selected or input word or phrase on the display unit 213. More specifically, the control unit 201 may receive a key signal corresponding to the keys input by the caller and display the word or phrase corresponding to the input key signal on the display unit 213. If the caller's mobile phone 101 is a device capable of speech recognition, the control unit 201 may input the word or phrase according to the caller's spoken input and display the input word or phrase on the display unit 213.

If the caller inputs a request for making an outgoing call in step 307, the control unit 201 will proceed to step 309. Otherwise, the control unit 201 will repeat step 307 until the request for an outgoing call is input.

In step 309, the call signal processor 215 of the control unit 201 generates an outgoing call message including the recipient's phone number input in step 301, the word or phrase input by the caller in step 305, and the caller's phone number. Then, the control unit 201 proceeds to step 311.

If the caller inputs a request for making an outgoing call in step 313, the control unit will proceed to step 315. Otherwise, the control unit 201 will repeat step 313 until the request for an outgoing call is input.

In step 315, the call signal processor 215 of the control unit 201 generates an outgoing call message including the recipient's phone number input in step 301 and the caller's phone number. Then, the control unit 201 proceeds to step 311.

In step 311, the control unit 201 sends the outgoing call message generated in step 309 or 315 to the base station 103 through a signaling channel.

Figure 4:
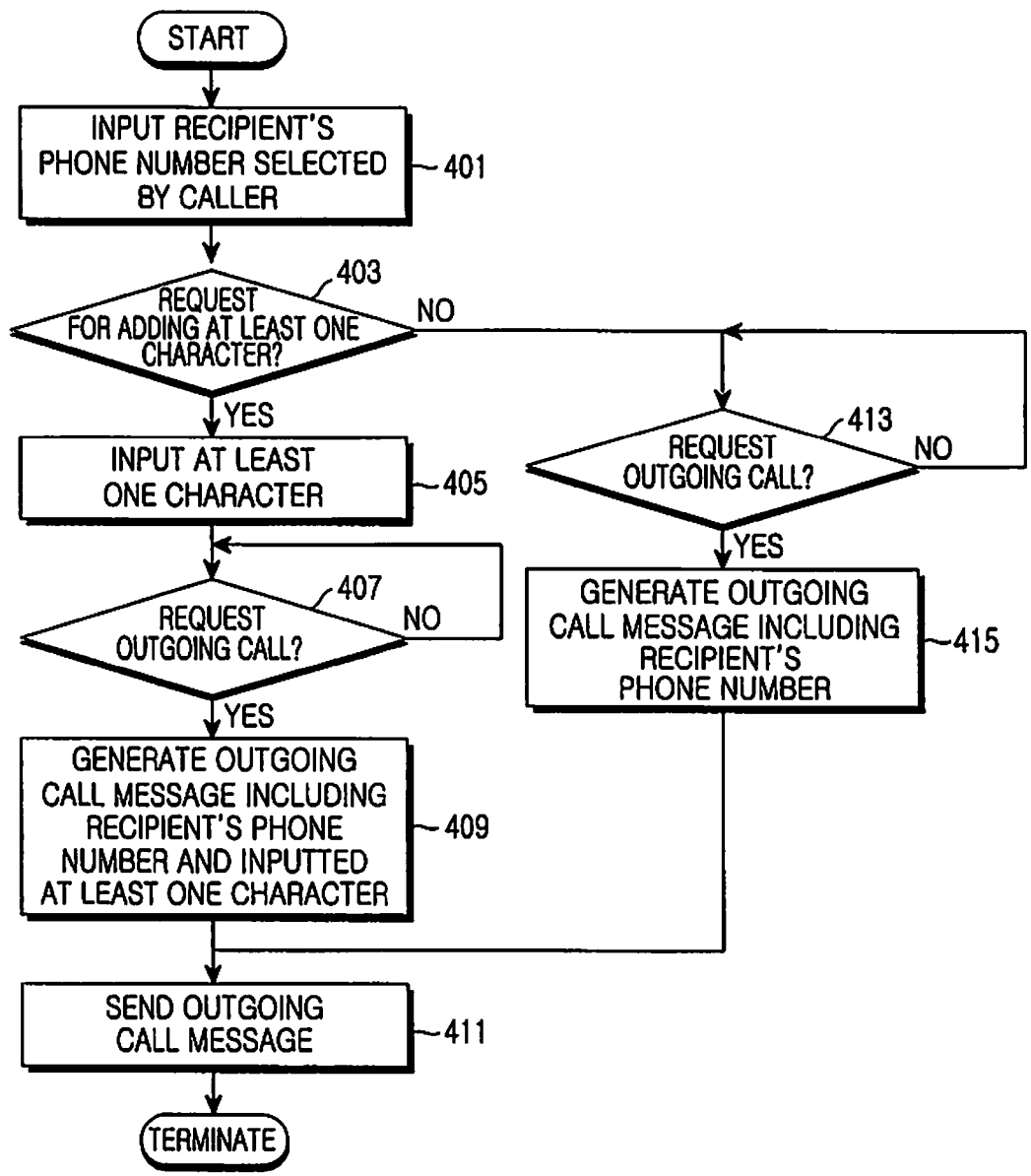
FIG. 4 is a flowchart showing a process of generating and sending an outgoing call message from a caller's mobile phone according to a second embodiment of the present invention.

FIG. 4 is a flowchart showing a process of generating and sending an outgoing call message from a caller's mobile phone 101 according to a second embodiment of the present invention. This process performed in the caller's mobile phone 101 will be explained in detail with reference to FIGS. 1 through 4.

In step 401, the control unit 201 inputs a recipient's phone number as selected by the caller. For example, the caller may select the recipient's phone number from one or more phone numbers stored in the phonebook. Then, the control unit 201 displays digits corresponding to the selected phone number on the display unit 213.

If the caller inputs a request to add at least one character in step 403, the control unit 201 will proceed to step 405. Otherwise, the control unit 201 will proceed to step 413.

In step 405, the control unit 201 generates an identifier after the previously input phone number in order to differentiate at least one character added by the caller from the recipient's phone number. When the caller inputs a desired word or phrase, the control unit 201 outputs the input word or phrase to the display unit 213 and then proceeds to step 407.

At this time, the caller may select a desired word or phrase from those previously stored in the memory 211 or directly input the word or phrase. The control unit 201 displays the selected or input word or phrase on the display unit 213. More specifically, the control unit 201 may receive a key signal corresponding to the keys input by the caller and display the word or phrase corresponding to the input key signal on the display unit 213. If the caller's mobile phone 101 is a device capable of speech recognition, the control unit 201 may input the word or phrase according to the caller's spoken input and display the input word or phrase on the display unit 213.

If the caller inputs a request for making an outgoing call in step 407, the control unit 201 will proceed to step 409. Otherwise, the control unit 201 will repeat step 407 until the request for an outgoing call is input.

In step 409, the call signal processor 215 of the control unit 201 generates an outgoing call message including the recipient's phone number input in step 401, the word or phrase input by the caller in step 405, and the caller's phone number. Then, the control unit 201 proceeds to step 411.

If the caller inputs a request for making an outgoing call in step 413, the control unit will proceed to step 415. Otherwise, the control unit 201 will repeat step 413 until the request for an outgoing call is input.

In step 415, the call signal processor 215 of the control unit 201 generates an outgoing call message including the recipient's phone number input in step 401 and the caller's phone number. Then, the control unit 201 proceeds to step 411.

In step 411, the control unit 201 sends the outgoing call message generated in step 409 or 415 to the base station 103 through a signaling channel.

Figure 5:
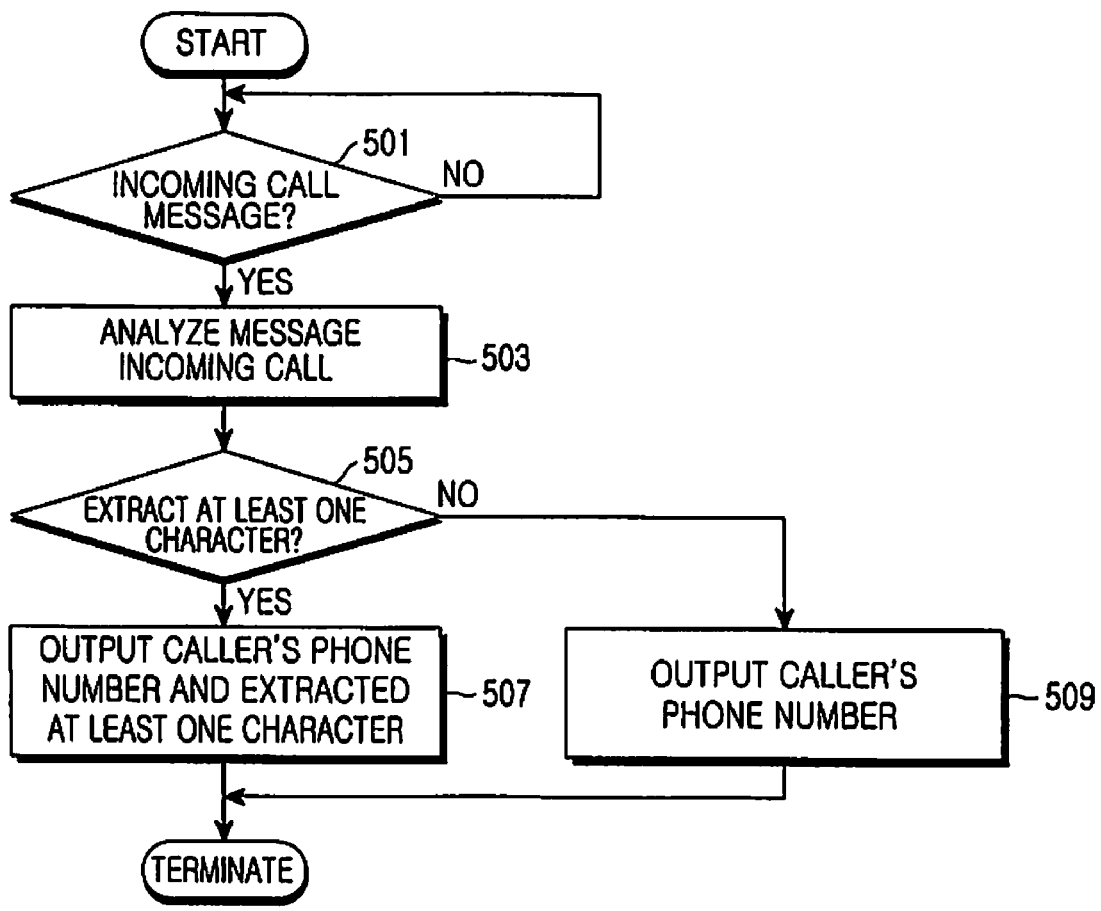
FIG. 5 is a flowchart showing a process of displaying caller identification information on a mobile phone receiving an incoming call message according to an exemplary embodiment of the present invention.

FIG. 5 is a flowchart showing a process of displaying caller identification information on a mobile phone 105 receiving an incoming call message according to an exemplary embodiment of the present invention. This process performed by the recipient's mobile phone 105 will be explained in detail with reference to FIGS. 1 through 5.

In step 501, the control unit 201 checks whether an incoming call message is received. Upon receiving an incoming call message, the control unit 201 will proceed to step 503. Otherwise, the control unit 201 will repeat step 501 until an incoming call message is received.

In step 503, the call signal processor 215 of the control unit 201 analyzes the incoming call message received in step 501. The call signal processor 215 extracts the caller's phone number from the incoming call message and then proceeds to step 505.

In step 505, the call signal processor 215 of the control unit 201 confirms whether any word or phrase is included in the incoming call message. The call signal processor 215 will recognize that at least one character is included in the incoming call message if it detects an identifier included in the message. Also, the call signal processor 215 will recognize that no word or phrase is included in the incoming call message if it detects no identifier in the message. If at least one character is included in the incoming call message, the call signal processor 215 of the control unit 201 will extract the word or phrase and then proceed to step 507. Otherwise, the call signal processor 215 of the control unit 201 will proceed to step 509.

In step 507, the control unit 201 outputs the caller's phone number extracted in step 503 and the word or phrase extracted in step 505 altogether, or only the word or phrase extracted in step 505. If no word or phrase is included in the incoming call message, the control unit 201 will proceed to step 509 in order to output only the caller's phone number extracted in step 503.

Figure 6:
FIG. 6 shows generation of an outgoing call message in a caller's mobile phone and caller identification information displayed on a recipient's mobile phone according to an exemplary embodiment of the present invention.
Figure 6:
Figure 6:
Figure 6:

FIG. 6 shows generation of an outgoing call message in a caller's mobile phone 101 and caller identification information displayed on a recipient's mobile phone 105 according to an exemplary embodiment of the present invention. The display of caller identification information on the recipient's mobile phone 105 according to the outgoing call message generated by the caller's mobile phone 101 will be explained in detail with reference to FIGS. 1 through 6.

For convenience of explanation, it is assumed that a caller's name and phone number are Chulsoo and 011-123-4567. It is also assumed that a recipient's name and phone number are Yeonghee and 011-765-4321.

Screens 601 and 603 in FIG. 6 show screenshots of the caller's mobile phone 101. The caller's mobile phone 101 shows the screen 601 when the caller inputs the recipient's phone number. If the caller inputs a request for making an outgoing call directly after the input of the recipient's phone number, the caller's mobile phone 101 will generate an outgoing call message including the recipient's phone number and no word or phrase, and will send the generated outgoing call message to the base station 103.

The caller's mobile phone 101 shows the screen 603 when the caller inputs the recipient's phone number and subsequently adds a phrase "Love You." "M" in screen 603 is an identifier for distinguishing the phrase added by the caller from the recipient's phone number. If the caller inputs a request for making an outgoing call after inputting the recipient's phone number and the phrase, the caller's mobile phone 101 will generate an outgoing call message including the recipient's phone number and the phrase "Love You," and will send the outgoing call message to the base station 103.

Screens 605 and 607 in FIG. 6 are screenshots of the recipient's mobile phone 105. Particularly, screen 605 shows the display of the caller's phone number on the recipient's mobile phone 105 when an incoming call message is received. If no identifier is included in the incoming call message, the recipient's mobile phone 105 will extract the caller's phone number from the incoming call message and detect the caller's name corresponding to the extracted phone number in the phonebook. Then, the recipient's mobile phone 105 will display the caller's name and phone number as shown in screen 605.

Screen 607 is also a screenshot when an incoming call message is received. The recipient's mobile phone 105 analyzes the incoming call message to extract the caller's phone number and then detects the caller's name corresponding to the extracted phone number in the phonebook. If an identifier "M" is included in the incoming call message, the recipient's mobile phone 105 will also extract the phrase "Love You" added after the identifier. The recipient's mobile phone 105 will display the caller's name and phone number and the extracted phrase "Love You" altogether as shown in screen 607.

As explained above, the recipient's mobile phone 105 can display at least one character included in an incoming call message, together with the caller's name and phone number. Alternatively, the recipient's mobile phone 105 can display only the word or phrase included in the incoming call message, without displaying the caller's phone number.

According to an exemplary embodiment of the present invention, the recipient's mobile phone extracts at least one character included in an incoming call message and displays the extracted word or phrase together with the caller's phone number. According to another embodiment of the present invention, it is possible to generate an outgoing call message including an image, such as an emoticon. If an incoming call message including an image is received, the recipient's mobile phone will extract the image and display the extracted image together with the caller's phone number. The recipient can identify the caller in view of the word or phrase included in an incoming call message.

Although exemplary embodiments of the present invention have been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A method for providing caller identification information by a caller's mobile phone, the method comprising the steps of:
   when there is a request, by a caller, for an addition of a word or phrase after an input of a call recipient's phone number, receiving, by the caller's mobile phone, an input of the word or phrase from the caller; and
   when the caller inputs a request for making an outgoing call, generating, by the caller's mobile phone, an outgoing call message, which includes a caller's phone number, the recipient's phone number, and an input word or phrase, and sending the generated outgoing call message to the recipient's mobile phone,
   wherein receiving the input of the word or phrase from the caller comprises:
   upon generating an identifier to request addition of the word or phrase, distinguishing the recipient's phone number and the word or phrase and adding the identifier after the recipient's phone number; and
   receiving the input of the word or phrase from the caller, and
   continuously arranging the recipient's phone number, the identifier and the word or phrase in order and displaying the recipient's phone number, the identifier and the word or phrase on a single screen of the caller's mobile phone.

2. The method according to claim 1, wherein, in the step of receiving the input of the word or phrase from the caller, the caller's mobile phone receives the input of the recipient's phone number as a phone number directly input by the caller.

3. The method according to claim 1, wherein, in the step of receiving the input of the word or phrase from the caller, the caller's mobile phone receives the input of the recipient's phone number as a phone number selected from a phonebook by the caller.

4. The method according to claim 1, wherein, in the step of receiving the input of the word or phrase from the caller, the caller's mobile phone receives a word or phrase selected by the caller from at least one word or phrase stored in advance.

5. The method according to claim 1, wherein, in the step of receiving the input of the word or phrase from the caller, the caller's mobile phone receives a word or phrase input directly by the caller.

6. The method according to claim 1, wherein the word or phrase is one of a word, image and emoticon inputted from the caller.

7. The method according to claim 1, wherein the identifier is a single character.

8. The method according to claim 1, wherein the outgoing call message includes the recipient's phone number, the identifier and the word or phrase which are continuously arranged in order.

9. A device for providing caller identification information in a caller's mobile phone, which comprises:
   a display unit;
   a memory configured for storing at least one word or phrase; and
   a control unit configured for, when there is a request for an addition of a word or phrase after input of a call recipient's phone number by a caller, receiving an input of the word or phrase from the caller, and when the caller inputs a request for making an outgoing call, generating an outgoing call message, which includes a caller's phone number, the call recipient's phone number, and an input word or phrase, and sending the generated outgoing call message to the call recipient's mobile phone,
   wherein, when there is the request for the addition of the word or phrase, the control unit generates an identifier for distinguishing the call recipient's phone number and the word or phrase, adds the identifier after the call recipient's phone number, and receives input of the word or phrase from the caller, and
   continuously arranging the call recipient's phone number, the identifier and the word or phrase in order and displaying the call recipient's phone number, the identifier and the word or phrase on a single screen of the caller's mobile phone.

10. The device according to claim 9, wherein the control unit receives the input of the recipient's phone number as a phone number directly input by the caller.

11. The device according to claim 9, wherein the control unit receives the input of the recipient's phone number as a phone number selected by the caller from a phonebook as the recipient's phone number.

12. The device according to claim 9, wherein the control unit receives the input of the word or phrase from the caller as a word or phrase selected by the caller from at least one word or phrase stored in advance.

13. The device according to claim 9, wherein the control unit receives the input of the word or phrase from the caller as a word or phrase input directly by the caller.

* * * * *